June 2, 1931. T. C. MOORSHEAD 1,807,857
GLASS SHAPING MACHINE
Filed Feb. 25, 1927 7 Sheets-Sheet 6

Patented June 2, 1931

1,807,857

UNITED STATES PATENT OFFICE

THOMAS COURTNEY MOORSHEAD, OF STRAND, ENGLAND, ASSIGNOR TO THE UNITED GLASS BOTTLE MANUFACTURERS LIMITED, OF LONDON, ENGLAND, A BRITISH COMPANY

GLASS SHAPING MACHINE

Application filed February 25, 1927, Serial No. 170,808, and in Great Britain August 31, 1926.

This invention relates to glass shaping machines for the purpose of manufacturing bottles or other glass containers in an automatic manner. In the specification of my Patent No. 1,482,762 I have described an automatic glass shaping machine in which successive moulds on a carrier continuously turned around the axis of the machine are filled from a continuously flowing stream of molten glass, the blank or parison, after its formation by pressing in the initial mould associated with a neck mould, being finished in a separate blowing or finishing mould. The present invention comprises an improved construction of machine of a type employing continuously moving blank and finishing moulds as in the aforesaid specification, but in which the continuous stream of glass supplying the blank moulds directly is not employed.

According to this invention the blank moulds are filled during continuous motion in an upright position past a flow feeder which feeds a definite charge or gob of glass into the open mouth of each mould as it passes the position of feed, whereupon the filled mould moves inwardly to receive and fill the neck mould, opens and moves back, leaving the blank or parison suspended, whereupon the blowing or finishing mould closes upon the parison and the vessel is completed by blowing in the finishing mould. The blank mould is preferably made in two hinged parts, which are closed together just before the charge of glass is to be dropped in an the entry of the glass may be assisted by a vacuum produced at the same moment, the two halves of the mould being pressed tightly together by a cam device when the charge is received.

The entry of the charge is facilitated by a guiding cup situated immediately over the mouth of the blank mould and ensuring the charge entering the mould symmetrically. The plunger which passes into the charge through the neck mould and forces the glass into the neck mould and forms the parison is operated mechanically and not by compressed air as in the specification above referred to and operates locking means for holding the mould closed against the internal pressure due to pressing. The blank or parison mould is swung into and out of charging position on a vertical pivot and the neck mould is toggle operated. The blank or parison moulds are arranged in an outer circle or ring except when brought into pressing position and the neck moulds are in an inner ring, the blank moulds being carried by swinging brackets which swing each mould inwardly, after it receives its charge, into the neck mould circle for the formation of the parison. The movement of the moulds is synchronized with the molten glass feeder. The finishing moulds move in a vertical plane, preferably on swinging arms, closing around the parison when they are brought into their raised position. All the various movements are effected in synchronized succession by fixed cam tracks around which the machine rotates.

In order that the invention may be more clearly understood and readily carried into effect, the same will now be described with reference to the accompanying drawings, in which:—

Figure 1:
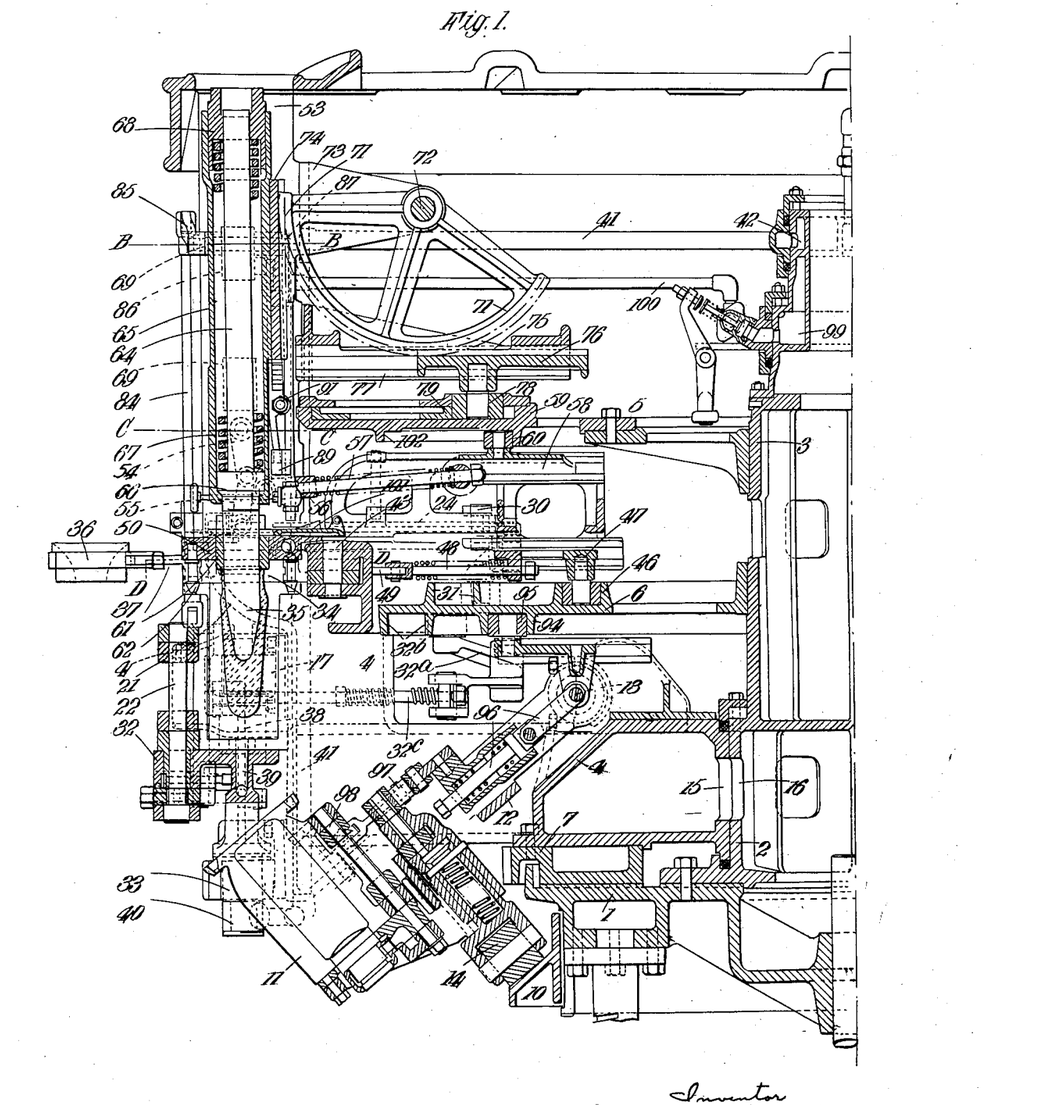
Figure 1 is a vertical section of a machine embodying this invention.
Figure 2:
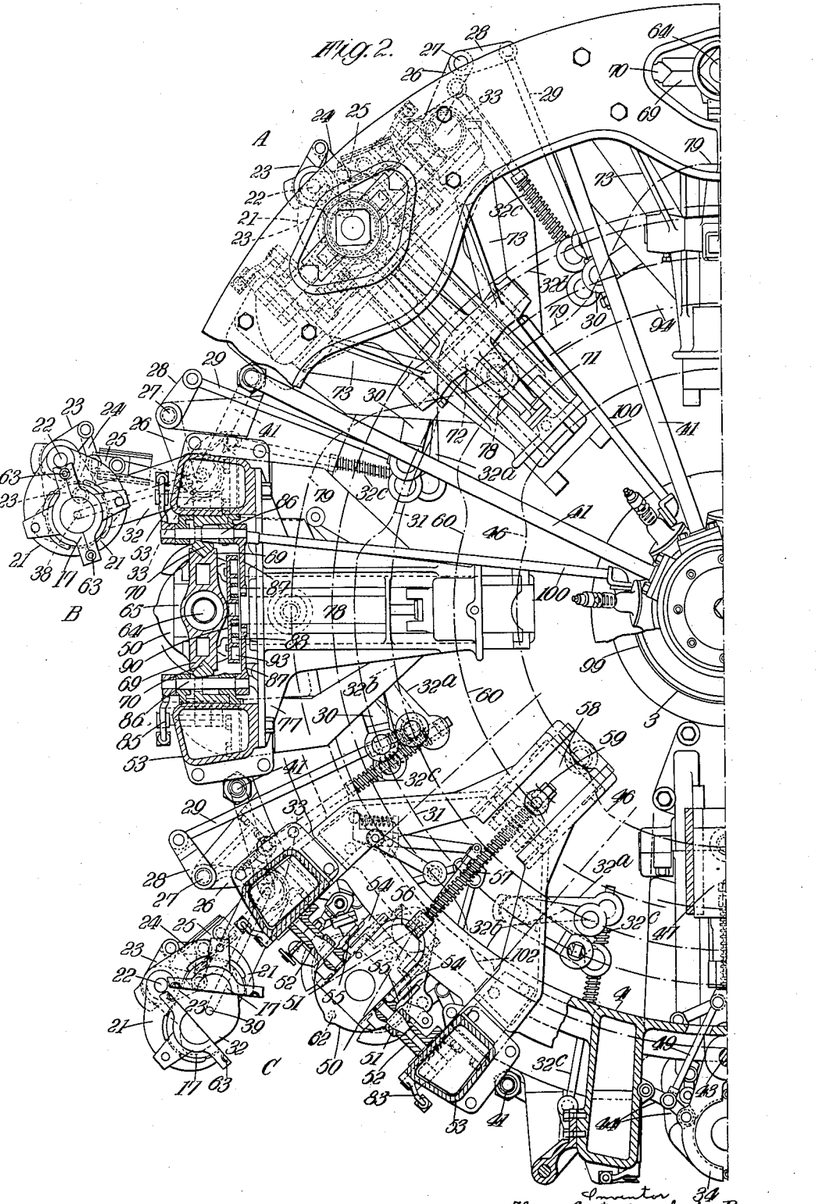
Figure 2 is a sectional plan showing at different sector sections at various levels of Figure 1.

The sectional plan view, Figure 2, shows the succession of moulds and associated apparatus arranged round the circle at equal distances, eight sets of moulds being indicated. The sector marked A is a plan of the top of the apparatus, while the sectors marked B, C, D, E, F, and G are sections at the levels indicated by the chain lines and corresponding lettering on Figure 1. At D, E and G the blank mould is removed from its arm to show the latter more clearly.

1 is a circular base which is supported as usual upon a travelling carriage so that it may be moved into working position relatively to the furnace. Centrally on this base is a hollow stationary column comprising the lower portion 2 and the upper portion 3, upon the lower portion 2 of the column being mounted the revolving frame 4 while the upper part of the column carries the upper and lower fixed cam rings 5 and 6 which are bolted in place upon the column. The revolving frame 4 is supported and turned by a toothed ring 7 on top of the base 1. This ring is bolted to the revolving frame and is driven by gearing 8 from any suitable external source of power.

The base 1 has a downwardly extending flange 9 which is encircled by a fixed track 10. This track serves for controlling the movement of the finishing or blowing mould 11, the carrier 12 of which is pivoted at 13 to a bracket carried by the revolving frame 4. The carrier is provided with the roller 14 which travels on the surface of the track 10 and according to the position on the track the mould 11 is raised or lowered, being shown in its lower position at the left-hand side of Figure 1 and in its raised position, where it receives the parison as hereinafter described, at the right-hand side of this figure.

The revolving frame 4 forms at its central part an air chamber which communicates through the ports 15 and 16 with the space in the column chamber 2 which is supplied with cooling air that passes into the revolving frame and is distributed through it to the various moulds for the purpose of cooling as is well understood.

17, 17 are the blank moulds which are arranged normally in a circle outside the periphery of the machine but each mould can be swung in after receiving the gob of glass. The blank mould is shown in its inner position, at the left-hand side of Figure 1 and sector A of Figure 2, and in its outer position at the right-hand side of Figure 1. In its outer position the mould during the rotation of the machine passes immediately under the feeder 18 (right hand side of Figure 1) which is supplied with the molten glass from the furnace of which it forms an extension and controls the formation of the gob of glass by means of the plunger 19 and the shears 20, the shears being placed immediately below the glass outlet and operated in synchronism with the movement of the machine. The gob is formed below the feeding aperture between the passage of successive moulds 17 and is cut off by the shears just as a mould passes below it.

The blank mould is made, like the blowing mould, in two halves operated by arms 21, hinged at 22 and arms 23 with toggle links 24, slide 25, lever 26 with fulcrum 27, lever 28, connecting rod 29, and cam lever 30 controlled through its roller by the cam track 31 on the lower cam ring 6. The action of the closing and opening mechanism is on well known lines.

The blank mould is mounted upon a swinging arm 32 pivoted at 33 round a vertical axis in bearings carried upon the revolving frame 4, as shown especially at the right-hand side of Figure 1. The mould is therefore maintained in its upright position throughout as the axis round which it is moved from one position to another is vertical. The arm 32 is operated from the track 32b on the ring 6 through a cam lever 32a and connecting rod 32c. In its inner position, to which it moves after it receives the charge of molten glass, the mould registers with the neck mould 34 and with the pressing plunger 35 while in its outer position as shown at the right hand side of Figure 1 it registers with the guiding cup 36 carried on the arm 37 fixed to the revolving frame 4 so as to maintain a constant position on the frame. A cup 36 is provided for each mould, permanently fitted at positions directly above the moulds when in their outer circle, but the cups are omitted in Figure 2 for the sake of greater clearness. When the blank mould is in its outer position immediately under the cup 36 the mould, in a closed condition, passes without pause beneath the feeding device of the furnace and at the moment it passes the feeding device the molten glass which has accumulated below the feeding aperture 18 is cut off by the shears 20 so as to form a gob of glass of the desired quantity, when the gob drops through the aperture of the cup 36 into the open top or mouth of the mould. To assist the glass to enter the mould rapidly and to prevent the formation of bubbles at the surface of the blank or parison due to air imprisoned in the blank mould by the glass entering from above, the lower part of the blank mould is connected to a vacuum or suction chamber at the moment when filling takes place. For this purpose a port 38 in the bottom of the blank mould connects, when the mould is closed and in its outer position, with a similar port 39 in the arm 32, which port extends down through the lower of the two pivots or journals 33 where it connects through a joint at 40 with a suction pipe 41 leading upwardly and inwardly to one chamber of the manifold 42, which chamber is maintained at a substantial vacuum through the suction pipe 42a. Thus when the mould is closed and just as it receives the gob of glass strong suction is applied to the interior of the mould, which as the glass drops into its open mould draws down the gob of glass and causes it to fill the mould up to the level of the glass supplied, bringing the glass into close contact with the sides of the mould and removing any air which may be dragged in with the gob of glass.

After the blank mould has been swung into its inner position, registering with the neck mould 34 and plunger 35, the neck mould, which is made as usual in halves hinged at 43 and opened or closed by the action of the toggles 44, (see sector D of Figure 2), closes through the operation of the track 46 on the lower cam ring 6 acting through the slide 47, a spring rod 48, and connecting rods 49, the fixed cam track 46 being shaped so as to give the desired opening and closing movements of the neck mould at the proper stages of the operation.

When the neck mould is closed, lying directly over the upper end of the blank mould, the plunger 35 is brought into operation but prior to this operation a registering device is actuated to ensure the proper alignment of the two moulds and the plunger. This registering arrangement (see Figures 3 and 4 and sector C of Figure 2) comprises a head 50 having guiding members 51 which engage with guides 52 of V-form bolted to upwardly extending portions 53 of the revolving frame 4. The movement of the registering device upon the guides is in a vertical direction and is controlled by toggle mechanism consisting of links 54, 55, a yoke 56, spring-rod 57 and slide 58, with a cam roller 59 which engages a track 60 on the underside of the upper cam ring 5.

The registering head 50 is provided with a bushing 61 which serves to guide the plunger 35 as it moves downwardly as hereinafter described, while the downward projection of this bushing 61 is embraced by the two halves of the neck mould 34 when these are closed and thus serves to register the neck mould in accurate alignment with the plunger. From the underside of the register head 50 two pins 62 project, these pins having conical ends adapted to register with corresponding recesses 63 in the top of the blank mould 11 (and also the top of the finishing mould 11 when this is in position) so that the mould is registered in correct relation with the register head and the neck mould.

As the blank mould 17 is closed when it moves, under the neck mould 34, the register head 50 must be raised sufficiently to allow the mould to pass under it and clear the pins 62. The lift of the register head to permit the mould to pass under it is effected by the toggle mechanism mentioned above, which as the charged blank mould moves inwardly from the filling to the pressing position momentarily raises the register head so that the pins 62 are clear of the mould 17. As soon as the latter has reached its pressing position under the neck mould 34 the register head is lowered so that the pins pass through the neck mould and engage the recesses in the blank mould and ensure its correct alignment with the neck mould and the pressing plunger. The cam track 60 on the fixed cam plate 5 is formed so as to give the desired vertical movement to the register head in synchronism with the movement of the mould as the complete machine is carried around the fixed cam tracks and stationary centre column.

When the blank mould has been swung back into position under the neck mould and the latter closed and in contact with the upper surface of the blank mould, the plunger 35 is brought into action so as to press the molten glass contained in the mould 17 and cause it to flow up and fill the neck mould round the plunger. The pressing plunger is secured in a plunger holder 64 mounted within the plunger crosshead 65 and capable of sliding vertically within the said crosshead, the downward movement of the plunger being limited by a collar 66 bearing against a shoulder formed in the crosshead 65. The plunger is normally held in its downward position by the pressure of a spring 67 which bears at its other end upon a nut or collar 68 threaded into the upper end of the crosshead 65. This crosshead is of hollow cylindrical form with projecting guide pieces 69 adapted to slide upon vertical guides 70 of V section which guides are carried upon upwardly projecting members 53 of the revolving frame 4.

The movement of the plunger 35 is effected by a toothed sector 71 mounted to swing upon a shaft 72 housed within brackets 73 carried upon the upwardly projecting members 53 of the revolving frame 4. The toothed sector 71 engages both with a toothed rack 74 on the crosshead 65 and with a second rack 75 on the slide 76, this slide being guided within a bracket 77 mounted on the part 53 of the revolving frame 4. The slide 76 carries a roller 78 engaging in the cam track 79 on the upper surface of the fixed cam ring 5, the track 79 therefore controlling the movement of the plunger 35 as the machine revolves. The spring 67 prevents injury in case the plunger 35 should meet undue resistance in its descent due to partially solidified glass or an excess of glass in the mould, or to excessive movement of the plunger, the plunger then being simply held against the yielding pressure of the spring while the crosshead 65 is allowed to complete its normal stroke.

Figure 3:
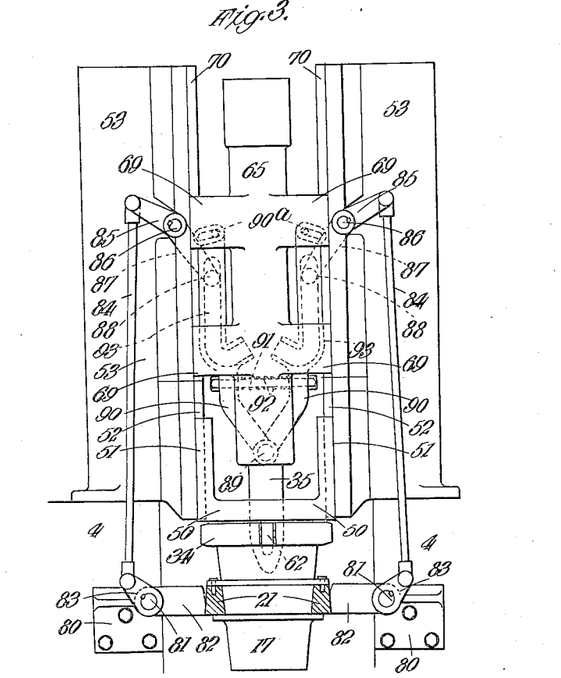
Figures 3 and 4 are detail views of the pressing apparatus.
Figure 4:
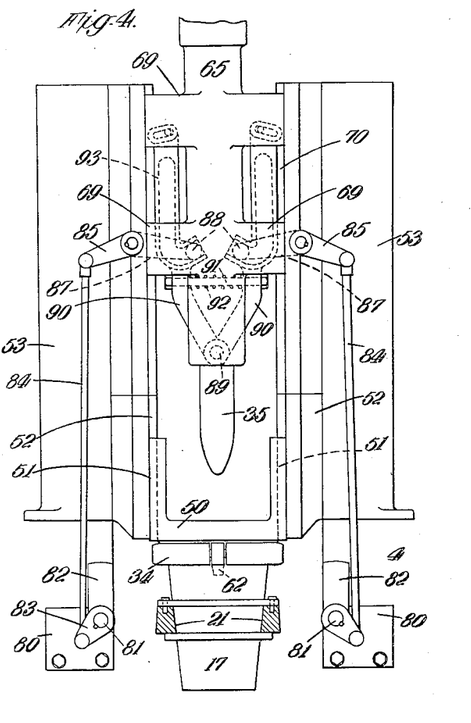
Figure 5:
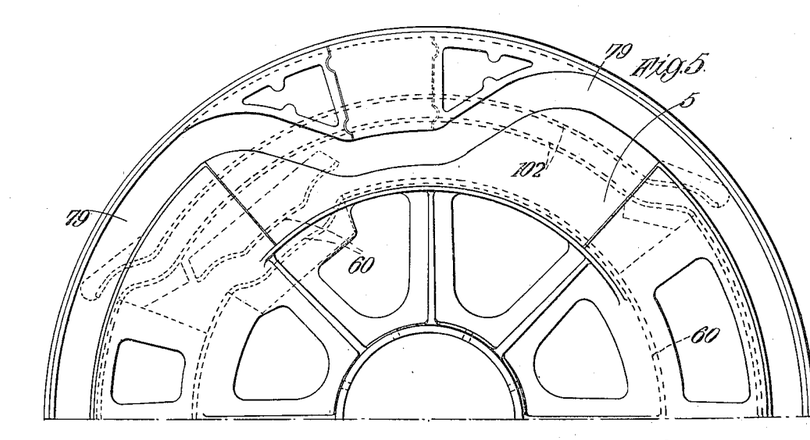
Figures 5 and 6 are half plan views of two fixed cam rings used in effecting various operations of the machine.
Figure 6:
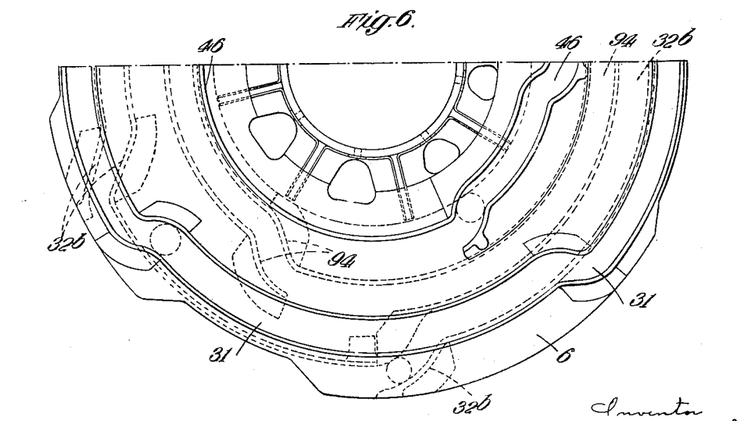
Figure 7:
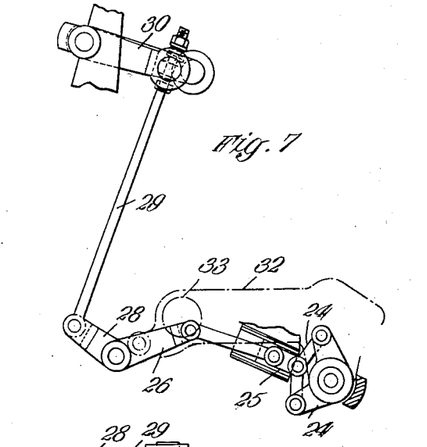
Figs. 7 and 8 are detail views of the blank-mould opening and closing means.
Figures 8, 10, 11:
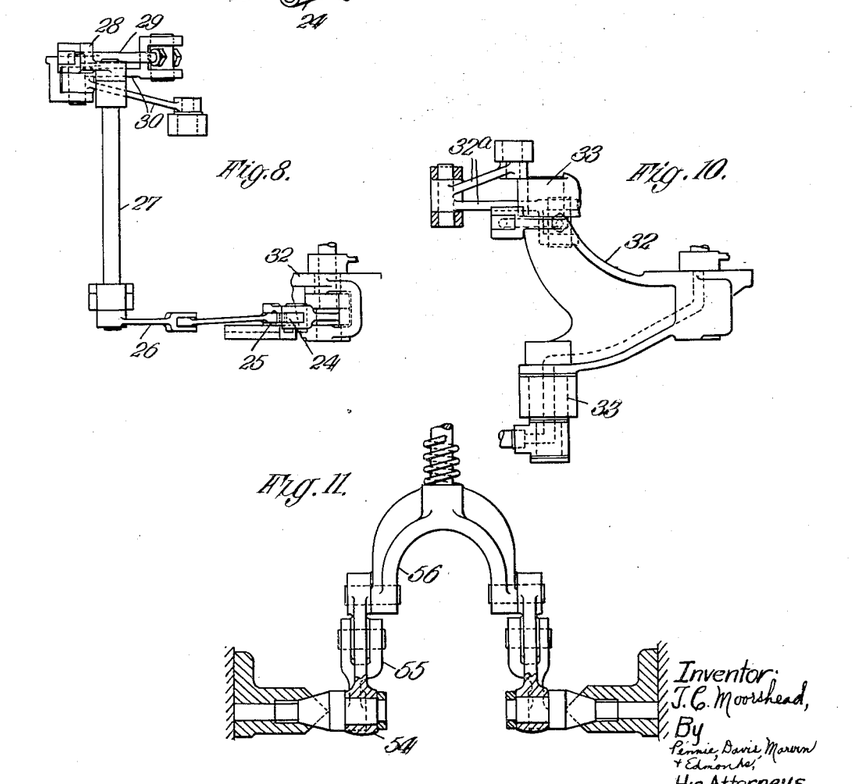
Figs. 9 and 10 are detail views of the blank-mould swinging means.
Fig. 11 is a detail view of the means for moving the register head.
Figure 9:
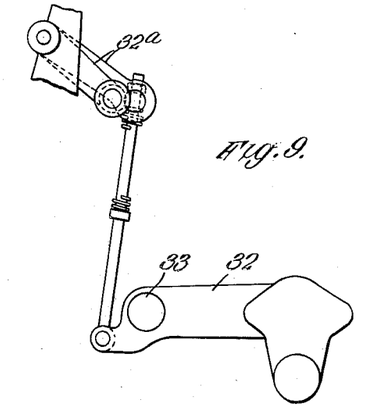

The pressure in the blank mould 17 due to the pressing operation of the plunger 35 is considerable and tends to force open the two halves of the blank mould, the molten glass setting up a hydrostatic pressure which, in view of the comparatively large internal area of the mould, exerts a considerable separating force. To avoid any risk of opening of the mould during the action of pressing, in order to form the neck, special means are provided, independent of the toggle mechanism for opening and closing the mould, to lock the two halves together. Such means may consist of a solid collar or ring fitting closely over the outside of the two halves of the mould when closed and brought down over the mould when the plunger descends, but it is preferred to use a wedging device such as is shown in Figures 3 and 4. Referring to these figures brackets 80 carried by the revolving frame 4 form bearings for two shafts 81, keyed to which are dogs or arms 82 which may be swung so as to be clear of the blank mould 17, as in Figure 4, or swung down into the jamming position shown in Figure 3, in which the dogs engage the arms 21 supporting the two halves of the mould.

These arms 21 may have inclined surfaces at the points met by the dogs 82 so as to give a wedging action as the dogs descend, or they may be vertical and the wedging action be given by the form of the dogs or the wedging may be due to mutually inclined surfaces on both members. The shafts 81 carry levers 83 connected through a rod 84 to the levers 85 each of which is mounted on a shaft 86 journalled in the members 53. To the other end of said shaft 86 is keyed a lever 87 having a roller 88 at its other end. Hinged at 89 upon the crosshead 65 are two arms 90 both of which are held in the position shown by the bolt 91 passing loosely through both arms to limit their separation and by the spring 92 which bears upon both arms and holds them separated against the heads of the bolt 91. A groove or track 93 is formed upon an extension of each arm 90 adapted to engage one of the rollers 88 carried upon the lever 87.

As soon as the plunger crosshead 65 starts to descend, carrying with it the plunger 35 so as to effect the pressing of the molten glass, the tracks 93 will cause the levers 87 through the engagement with the rollers 88 to swing downwardly and outwardly, causing the dogs 82 to swing downwardly from the position shown in Figure 4 to that shown in Figure 3, in which position they engage the arms 21 which close the blank mould 17. It is important that in locking the mould in its closed position the dogs or gripping means should not force the mould out of accurate alignment with the neck mould 34 and register head 50 and in order that this condition shall be attained the dogs are interconnected so that should one of them engage the surface of the corresponding arm 21 in advance of the engagement of the other dog, the first one being retarded on engagement will, through the linkage connecting it with its lever 87, cause the latter to offer greater resistance to the action of the track 93 upon the arm 90, tending to cause this arm to swing over. This has the effect of advancing the second dog 82 by the amount that the first dog is retarded, thus tending to equalize the pressure that each dog exercises upon the blank mould arms 21 irrespective of slight variations in their positions relatively to the mould. The movement of the arms 90 is limited by the slot and pin connection 90a to the guide extensions 69.

The mechanism for opening and closing the finishing mould 11 follows lines already known in glass-making machines. The operations are controlled from the track 94 on the lower cam ring 6 acting through the roller 95, linkage 96 and toggle members 97 on the hinged halves of the finishing mould, which are hinged together by the hinge member 98. The track 94 is shaped so as to open the finishing mould 11 immediately after the glass has been blown within the mould and the mould has been lowered into the position shown at the left-hand side of Figure 1, holding the mould open until it is lifted again to encircle the semi-molten parison.

The operation of the various parts has already been described in some detail, but to make the operation of the machine as a whole clear the various stages in the manufacture of the bottle are described as follows:—

Starting with a blank mould 17 in its closed position and swung outwards on its arm 32 into the outer circle of moulds (B to G, Figure 2) it approaches, as the machine revolves, the pour-out or charging point of the glass. Immediately before reaching this point, that is below the feeder 18, the mould 17 is connected to vacuum through the ports 38, 39, joint 40, and piping 41, but practically simultaneously with the connection to vacuum the gob of glass which has been formed under the feeder 18 and is cut off by the shears 20 drops into the open mouth of the blank mould 17, passing through the aperture in the cup 36 and assisted in entering the mould 17 by the suction produced in the latter. As soon as the glass has settled into the mould the arm 32 acted upon by the cam track 32b swings inwardly carrying with it the mould until the latter is moved into the inner mould circle immediately below and in register with the closed neck mould 34, the register head 50 being raised as already described to allow the mould to move into position. When the inward movement is completed the register head descends and holds the mould in correct alignment.

Immediately the mould has been secured in position the plunger 35 descends along with its crosshead 65 (bringing the locking device just described into action on the mould), the plunger displacing the glass in the mould so that a portion of it flows upwardly around the plunger and completely fills the cavity in the neck mould 34. The chilling action of the neck mould and plunger causes the glass to set in this mould and the plunger 35 when it rises clear of the blank and neck moulds frees the blank mould and allows the latter to open and to be swung out again upon its supporting arm 32 into its normal position in the outer mould circle, leaving the blank or parison suspended by its neck from the neck mould 34. Immediately the blank mould 17 and its arm are out of the way the blowing or finishing mould 11 is swung upwardly through the action of the track 10 and registers with the neck mould 34, the mould 11 being immediately closed and the parison within the mould blown to its finished form. The blowing is effected by compressed air from a chamber 99 supplied with compressed air through the pipe 99a and belonging to the upper part 3 of the central column, this chamber being connected through pipes 100 to ports in the register heads 50, a blowing slide 101 (on right hand side of Figure 1) being moved over the register head 50 so as to close in the top and hold the pressure air which then blows out the still mainly molten glass against the interior surface of the mould 11. The blowing slide 101 is actuated from the cam track 102 on the underside of the upper cam ring 5.

As soon as the blowing is completed the two halves of the neck mould 34 are separated so as to release the blown glass within the finished mould 11 which is immediately swung downwards, the bottle continuing within the mould until as the machine revolves it reaches a suitable position, at which it is delivered in a finished state by the opening of the mould 11  As soon as the neck mould 34 starts to open in order to release the blown bottle in the finishing mould the register head 50 moves up to a position to admit the blank mould 17 beneath the plunger 35 to begin a new cycle of operations. The neck mould closes again as soon as the bottle is clear. The cycle of operations in the machine shown is repeated eight times during one complete revolution of the machine.

What I claim and desire to secure by Letters Patent of the United States is:—

1. A glass shaping machine comprising the combination of a frame rotatable about a central vertical support and having a plurality of blank moulds mounted thereon, a stationary cam track mounted on the support, supporting arms for the blank moulds, means by which the stationary cam track is caused to move the supporting arms with the blank moulds thereon so that at times the moulds are rotating in an outer circle to receive a charge of glass and at other times are rotating in an inner circle to cooperate with neck moulds, a vertically movable register head having downwardly extending registering pins, a second stationary cam track on the central support, a roller carried by the rotatably mounted frame and engaging the second cam track, and toggle mechanism arranged between the roller and the register head so that rotary movement of the frame causes vertical movement of the register head.

2. A glass shaping machine comprising the combination of a rotary mould carriage having a blank mould mounted thereon, the said blank mould being made of two parts and being carried on a supporting arm which is pivotally mounted on the mould carriage, means for moving the supporting arm about its pivot so that at times the blank mould is traveling in an outer circle to receive a charge of glass and at other times is traveling in an inner circle to cooperate with a neck mould, a vertically movable crosshead, means for raising and lowering the crosshead, cam members carried by the crosshead, mould retaining members pivotally mounted on the mould carriage and means extending between the mould retaining members and the cam members to cause the mould retaining members to move into engagement with the blank mould as the crosshead descends.

3. A glass shaping machine comprising the combination of a rotary mould carriage having guideways extending upwardly therefrom and a plurality of mould retaining members pivotally mounted on the lower part thereof, a crosshead movable on said guideways and provided with a plurality of cam members, a blank mould made of two parts and carried on a supporting arm which is pivotally mounted on the mould carriage, scissor arms embracing the two parts of the blank mould, means for causing the two parts of the blank mould whilst held together by the scissor arms to travel in vertical alignment with a neck mould and in lateral alignment with the said mould retaining members, levers interposed between the cam members and the mould retaining members, and means for raising and lowering the crosshead and cams so as to cause the mould retaining members to be turned about their pivots and to be brought into and out of engagement with the scissor arms.

4. A glass shaping machine comprising the combination of a rotary mould carriage having guideways extending upwardly therefrom and a plurality of mould retaining members pivotally mounted on the lower part thereof, a crosshead movable on the said guideways, a stationary cam track, means by which the cam track is caused to raise and lower the crosshead, a blank mould made of two parts and carried on a supporting arm which is pivotally mounted on the mould carriage, means for causing the blank mould to travel in vertical alignment with a neck mould and in lateral alignment with the mould retaining members, a cam member pivotally mounted on the crosshead and levers extending between the cam member and the mould retaining members, the arrangement being such that the mould retaining members are caused to act simultaneously and equally upon the two halves of the blank mould.

5. A glass shaping machine comprising the combination of a rotary mould carriage having guideways extending upwardly therefrom and a plurality of mould retaining members pivotally mounted on the lower part thereof, a crosshead having a plurality of interconnected cam members pivotally mounted thereon, levers extending between the cam members and the mould retaining members, a two part blank mould located between the mould retaining members and movable with the mould carriage so that it is maintained in vertical alignment with a neck mould arranged above the blank mould, and means for raising and lowering the crosshead to cause the mould retaining members to turn on their pivots and to be brought into and out of engagement with the blank mould.

6. A glass shaping machine comprising the combination of a rotatably mounted frame carrying a plurality of blank moulds and neck moulds, means for imparting a continuous rotary movement to the frame, means for moving the blank moulds in a horizontal plane so that at times they are rotating in an outer circle and in an upright position past a charging orifice and at other times are rotating in an inner circle to cooperate with the neck moulds, guideways extending upwardly from the rotatably mounted frame, a plunger crosshead movable on the said guideways, a plurality of interconnected cam members pivotally mounted on the crosshead, pivotally mounted mould retaining members, levers extending between the cam members and the mould retaining members and means for raising and lowering the crosshead.

7. A glass shaping machine comprising the combination of a rotatably mounted frame carrying a plurality of blank moulds and neck moulds, a vertically movable crosshead associated with each of the blank moulds, a pressing plunger slidable within each of the crossheads, a plurality of mould retaining members pivotally mounted on the lower part of the frame and connected by levers to a plurality of cams pivotally mounted on the crosshead, means for raising and lowering the crosshead to cause the levers to move the mould retaining members into and out of engagement with a blank mould in alignment with a neck mould.

8. A glass shaping machine comprising the combination of a rotatably mounted mould frame, a plurality of upright blank moulds thereon, supporting arms for the blank moulds, guiding cups carried by the mould frame, a stationary cam track, means by which the cam track is caused to swing the supporting arms in a horizontal plane so that at times the blank moulds are rotating in an outer circle in vertical alignment with the guiding cup to receive a charge of glass and at other times are rotating in an inner circle in vertical alignment with a neck mould and a vertically movable register head.

9. A glass shaping machine comprising the combination of a rotatably mounted mould carriage, means for imparting a continuous rotary movement thereto, a plurality of blank moulds, blow moulds, neck moulds and a register head carried by the mould carriage, supporting arms for the blank moulds, means for swinging the supporting arms in a horizontal plane so that at times the blank moulds are rotating in an outer circle past a charging orifice and at other times are rotating in an inner circle to cooperate with the neck moulds, means for causing the blow moulds to move radially in a vertical plane, and means for causing the register heads to move in a vertical plane so as to register the blank moulds and the blow moulds with the neck moulds.

10. A glass shaping machine comprising a central vertical support, a frame carried by and rotatable about said support, blank moulds, neck moulds, blow moulds and vertically movable register heads all carried by said frame, means to move the register heads so that at times they serve to ensure proper alignment of the blank moulds with the neck moulds and at other times serve to ensure proper alignment of the blow moulds with the neck moulds.

11. A glass shaping machine comprising a central vertical support, a frame carried by and rotatable about said support, means to rotate said frame continuously, blank mould supporting arms pivoted to said frame, blank moulds carried by said arms, the said arms and blank moulds rotating continuously with the frame, means to move the supporting arms with the blank moulds thereon so that at times the moulds are rotating in an outer circle and in an upright position to receive a charge of glass and at other times are rotating in an inner circle, neck moulds carried by the frame so as to move continuously in said inner circle, a plurality of vertically movable register heads mounted on said frame, and means to move said register heads so that at times they serve to ensure proper alignment of the blank moulds with the neck moulds and at other times serve to ensure proper alignment of the blow moulds with the neck moulds.

12. A glass shaping machine comprising a central vertical support, a frame carried by and rotatable about said support, means to rotate said frame continuously, blank moulds comprising separable parts, neck moulds, blow moulds and vertically movable register heads all carried by said frame, means to move the register heads so that at times they serve to ensure proper alignment of the blank moulds with the neck moulds and at other times serve to ensure proper alignment of the blow moulds with the neck moulds, and means operated independently of the register heads for locking the parts of the blank moulds against separation at the appropriate times.

13. A glass shaping machine comprising a central vertical support, a frame carried by and rotatable about said support, blank moulds comprising separable parts, neck moulds, blow moulds and vertically movable register heads all mounted on said frame, means for raising and lowering said register heads so that at times they serve to ensure proper alignment of the blank moulds with the neck moulds and at other times serve to ensure proper alignment of the blow moulds with the neck moulds, and separate means for locking the parts of the blank moulds against separation at the appropriate times.

14. A glass shaping machine comprising a central vertical support, a frame carried by and rotatable about said support, means to rotate said frame continuously, blank moulds comprising separable parts, neck moulds and vertically movable register heads all carried by said frame, means for raising and lowering the register heads so that they ensure proper alignment of the blank moulds with the neck moulds, and pairs of locking members adapted to bind the parts of the blank moulds together at the appropriate times by a jamming action.

15. A glass shaping machine comprising a central vertical support, blank moulds supporting arms pivoted to said frame, blank moulds comprising separable parts carried by said arms, means to move the supporting arms with the blank moulds thereon so that at times the moulds are rotating in an outer circle and in an upright position to receive a charge of glass and at other times rotating in an inner circle, neck moulds carried by the frame so as to move continuously in said inner circle, a plurality of vertically movable register heads mounted on said frame and adapted to co-operate with the blank moulds and neck moulds to bring them into alignment, and pairs of locking members adapted to bind the parts of the blank moulds together at the appropriate times by a jamming action.

16. A glass shaping machine comprising a central vertical support, a frame carried by and rotatable about said support, means to rotate said frame continuously, blank mould supporting arms pivoted to said frame, blank moulds comprising separable parts carried by said arms, said arms and blank moulds rotating continuously with the frame, means to move the supporting arms with the blank moulds thereon so that at times the moulds are rotating in an outer circle and in an upright position to receive a charge of glass and at other times are rotating in an inner circle, neck moulds carried by the frame so as to move continuously in said inner circle, horizontal pivots carried by said frame, blow moulds mounted for movement about said pivots, means to move said blow moulds upwards about said pivots to bring them into co-operation with the neck moulds, a plurality of vertically movable register heads mounted on said frame, means for raising and lowering said register heads so that at times they serve to ensure proper alignment of the blank moulds with the neck moulds and at other times serve to ensure proper alignment of the blow moulds with the neck moulds, and pairs of locking members adapted to bind the parts of the blank moulds together at the appropriate times by a jamming action.

17. A glass shaping machine, comprising a central vertical support, a frame carried by and rotatable about said support, a relatively long blank mould supporting-arm pivoted to said frame, a blank-mould carried by said arm, means cooperating with the blank mould to form the blank therein, mechanism for swinging said arm inwardly in a horizontal plane to bring said mould into proximity with said forming means and to swing the arm outwardly to one side of said means to bring said mould into a position to receive a charge of glass, the relative construction and movement of said supporting arm being such that when it is moved outwardly the arm and the blank mould carried thereby are removed to one side of said forming means, thereby providing accessibility for adjustment and renewal of said forming means and the other adjacent parts of the machine.

THOMAS COURTNEY MOORSHEAD.